US010810224B2

United States Patent
Bauer et al.

(10) Patent No.: US 10,810,224 B2
(45) Date of Patent: Oct. 20, 2020

(54) COMPUTERIZED METHODS AND PROGRAMS FOR INGESTING DATA FROM A RELATIONAL DATABASE INTO A DATA LAKE

(71) Applicant: International Business Machines Corporation, Armonk, NY (US)

(72) Inventors: Daniel N. Bauer, Birmensdorf (CH); Luis Garcés Erice, Rueschlikon (CH); John G. Rooney, Zurich (CH); Peter Urbanetz, Wadenswil (CH)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/020,829

(22) Filed: Jun. 27, 2018

(65) Prior Publication Data
US 2020/0004862 A1    Jan. 2, 2020

(51) Int. Cl.
*G06F 16/25*    (2019.01)
*G06F 16/21*    (2019.01)
*G06F 16/22*    (2019.01)

(52) U.S. Cl.
CPC .......... *G06F 16/254* (2019.01); *G06F 16/214* (2019.01); *G06F 16/2291* (2019.01)

(58) Field of Classification Search
CPC ... G06F 16/254; G06F 16/2291; G06F 16/214
See application file for complete search history.

(56) References Cited

U.S. PATENT DOCUMENTS 9,679,041 B2    6/2017   Aasman
2010/0211539 A1*    8/2010   Ho .................... G06F 16/972
                                                                                                707/602
(Continued)

FOREIGN PATENT DOCUMENTS

WO      2017106851      6/2017

OTHER PUBLICATIONS

Simitsis et al. "Optimizing analytic data flows for multiple execution engines," Proceedings of the 2012 ACM SIGMOD International Conference on Management of Data, 2012. (Year: 2012).*

(Continued)

*Primary Examiner* — Jay A Morrison
(74) *Attorney, Agent, or Firm* — Daniel P. Morris, Esq.; Hoffman & Baron, LLP (57) ABSTRACT

A computerized method for ingesting data from a relational database into a data lake is provided, wherein a user-defined function (UDF) is associated with a standard operation of extract, transform, load, or ETL, of an ETL pipeline. This UDF is triggered upon performing the standard operation and thereby allow a code associated with the UDF to be executed. Upon migrating data from one or more data sources into the relational database, the standard operation is executed, which triggers the UDF and, in turn, an execution of the code. As per the execution of this code, an entity running on the data lake is notified that a set of data migrated to the relational database is to be ingested according to given ingestion modalities specified by the code. Finally, the set of data can be ingested into the data lake according to the modalities. Related computer program products are also provided.

19 Claims, 3 Drawing Sheets

(56) References Cited

U.S. PATENT DOCUMENTS

| | | | |
|---|---|---|---|
| 2012/0102007 A1* | 4/2012 | Ramasubramanian | ....................... G06F 16/254 707/705 |
| 2014/0358844 A1* | 12/2014 | Mundlapudi | ......... G06F 16/254 707/602 |
| 2015/0347540 A1* | 12/2015 | Singh | .................. G06F 16/2365 707/602 |
| 2016/0253340 A1 | 9/2016 | Barth | |
| 2016/0314202 A1 | 10/2016 | Gomadam | |
| 2017/0177309 A1 | 6/2017 | Bar-Or | |
| 2017/0286526 A1 | 10/2017 | Bar-Or | |
| 2018/0101583 A1* | 4/2018 | Li | ......................... G06F 16/254 |
| 2018/0150529 A1* | 5/2018 | McPherson | ........... G06F 16/254 |
| 2018/0196858 A1* | 7/2018 | Srivastava | .............. G06F 9/547 |

OTHER PUBLICATIONS

Liu et al., "An ETL optimization framework using partitioning and parallelization," Proceedings of the 30th Annual ACM Symposium on Applied Computing, 2015. (Year: 2015).*

Bringing Relational Data Into Data Lakes, p. 2, found at URL: http://blog.cask.co/2016/06/bringing-relational-data-into-data-lakes/.

The Best Data Ingestion Tools for Migrating to a Hadoop Data Lake, p. 5, Home-Grown Ingestion Patterns, URL: http://rcgglobalservices.com/blog/the-best-data-ingestion-tools-for-migrating-to-a-hadoop-data-lake/.

Using Azure Data Lake Store for Big Data Requirements, p. 1, URL: https://docs.microsoft.com/en-us/azure/data-lake-store/data-lake-store-data-scenarios#ingest-data-into-data-lake-store.

* cited by examiner

FIG. 3

COMPUTERIZED METHODS AND PROGRAMS FOR INGESTING DATA FROM A RELATIONAL DATABASE INTO A DATA LAKE

BACKGROUND

The invention relates in general to the field of computerized techniques for ingesting data from a relational database into a data lake. In particular, it is directed to methods involving an extract, transform, load (ETL) pipeline.

Over the last ten years the development of a range of new technologies has enabled the processing of data at scales that were previously unimaginable. The location in which data from multiple different sources is stored, cataloged and processed is often called a "data lake".

A data lake is a storage repository that holds a huge amount of raw or refined data in native format until it is accessed. A data lake typically relies on Hadoop-compatible object storage, according to which an organization's data is loaded into a Hadoop platform. Then, business analytics and data-mining tools can possibly be applied to the data where it resides on the Hadoop cluster. However, data lakes can also be used effectively without incorporating Hadoop, depending on the needs and goals of the organization. More generally, a data lake is a large data pool in which the schema and data requirements are not defined until the data is queried.

Still, data lakes often build on new technologies such as scalable file systems (e.g., Hadoop distributed file system, or HDFS), no SQL databases (e.g., Casandra), object stores (e.g., S3) and processing frameworks (e.g., Spark). These technologies are designed to allow the system to scale to petabytes of data and beyond. As such, they are radically different from relational database systems in which business's critical data is stored.

One of the key enabling technologies for a data lake is to allow so called "silo-ed" data available within existing data sources (e.g., warehouses) to be ingested into the lake. Specific technologies such as Sqoop have been developed exactly for this purpose, but they require skill sets beyond those required for standard ETL processing common within data warehouses. Such technologies are furthermore perceived as not being easy to integrate into ETL pipelines.

SUMMARY

According to a first aspect, the invention is embodied as a computerized method for ingesting data from a relational database into a data lake. According to this method, a relational database is provided, wherein a user-defined function, or UDF, is associated with a standard operation of extract, transform, load, or ETL, of an ETL pipeline. This UDF is designed so as to be triggered upon performing said standard operation and thereby allow a code associated with said UDF to be executed. Thus, upon migrating data from one or more data sources into the relational database (according to said ETL pipeline), said standard operation is executed, which triggers said UDF and, in turn, an execution of said code. As per the execution of this code, an entity running on the data lake is notified that a set of data migrated to the relational database is to be ingested according to given ingestion modalities specified by the code. Finally, said set of data can be ingested into the data lake according to said modalities.

According to another aspect, the invention is embodied as a computer program product for ingesting data from a relational database into a data lake. The computer program product comprising a computer readable storage medium having program instructions embodied therewith. The program instructions are executable by one or more processors of a computerized system, so as to run a relational database such as described above. I.e., it includes a specifically designed UDF, which is nevertheless associated with a standard ETL operation of an ETL pipeline.

Computerized methods and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements or method steps in the figures have been allocated the same numeral references, unless otherwise indicated.

DETAILED DESCRIPTION OF EMBODIMENTS OF THE INVENTION

One of the key enabling technologies for a data lake is to allow so called "silo-ed" data available within existing data sources (e.g., warehouses) to be ingested into the lake. Specific technologies have been developed to allow data available within existing data sources to be ingested into the lake, but such technologies require skill sets beyond those required for standard ETL processing common within data warehouses. There is therefore an impedance between the world of data sources such as data warehouses and that of the big data lake systems.

The following description, which discloses techniques to bridge this impedance, is structured as follows. First, general embodiments and high-level variants are described (sect. 1). The next section addresses more specific embodiments and technical implementation details (sect. 2).

1. General Embodiments and High-Level Variants

Figure 1:
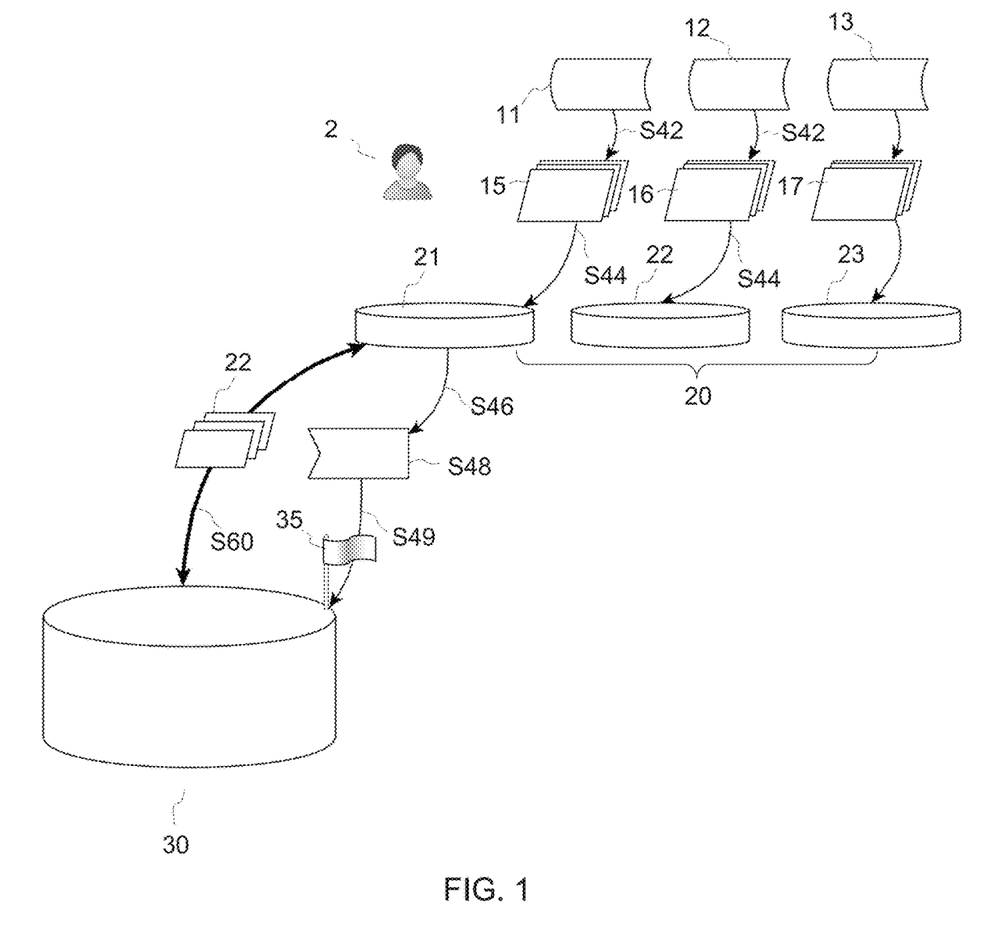
FIG. 1 is a block diagram schematically illustrating a data lake and a relational database system comprising multiple databases for migrating data from multiple data sources such as data warehouses, as involved in embodiments.
Figure 2:
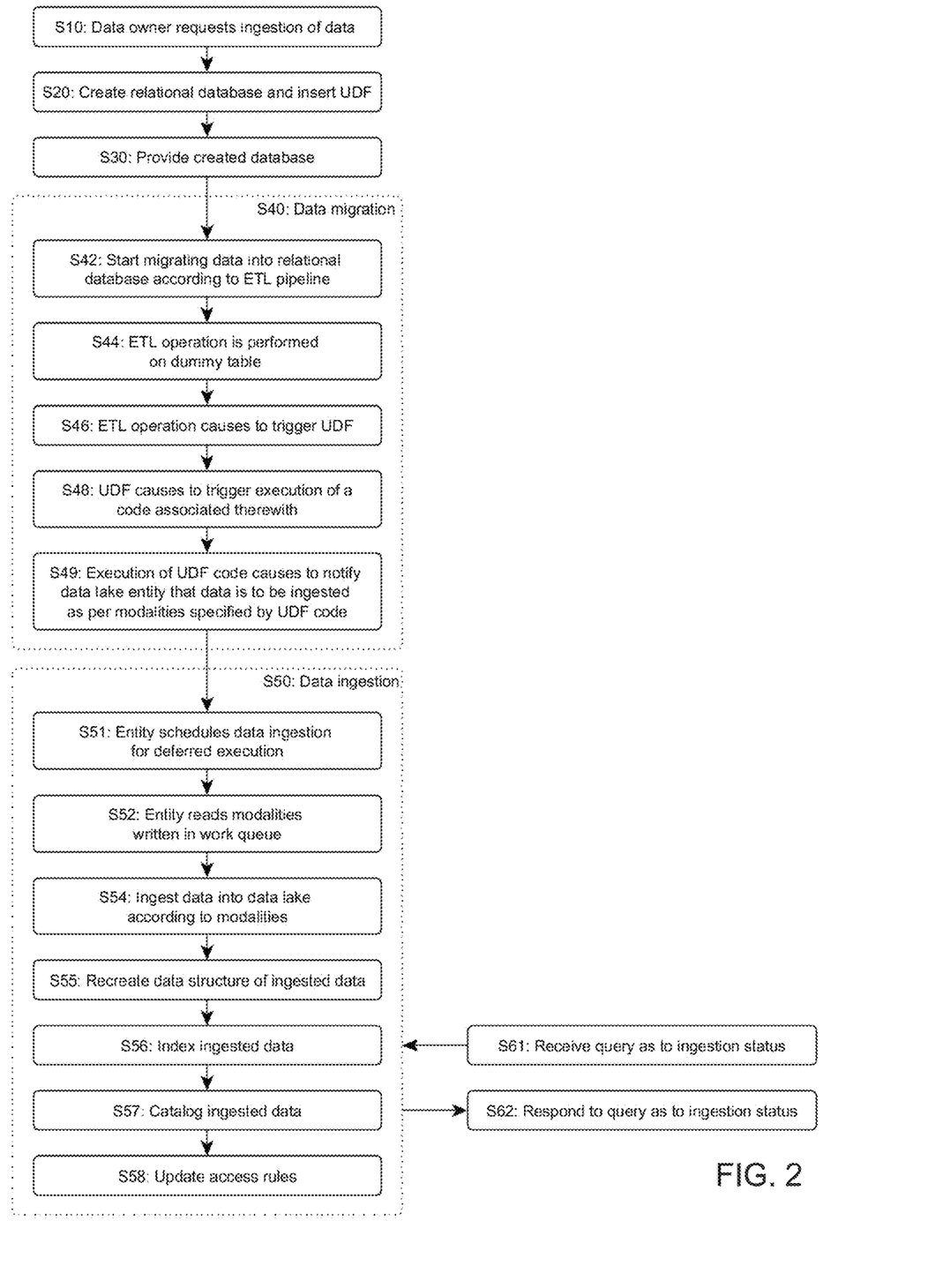
FIG. 2 is a flowchart illustrating steps of a method for ingesting data, as in embodiments.

In reference to FIGS. 1, 2, an aspect of the invention is first described, which concerns a computerized method for ingesting data from a relational database 21 (e.g., Db2) into a data lake 30 (e.g., a big data system).

Essentially, this method relies on providing (step S30, FIG. 2) a relational database 21 (e.g., to a data ingestor 2), wherein a specifically designed user-defined function (UDF) is associated with a standard operation of extract, transform, load (ETL) of an ETL pipeline. As known, an ETL pipeline refers to a set of processes extracting data from one system, transforming it, and loading into a database.

In detail, the UDF is designed so as to be triggered upon performing said standard operation. In turn, triggering the UDF allows a code associated therewith to be executed. In general, a UDF corresponds to a piece of code that an end user may insert into a system to extend its capabilities. In the present case, the UDF used is devised for a relational database 21-23, so as to allow a code (e.g., an application-specific code) to be executed on a standard ETL type operation.

Next, data 15 can be migrated (step S40) from one or more data sources 11-13 into the relational database 21, based on the ETL pipeline, such that said standard operation will be executed S44. This, in turn, triggers S46 the UDF and, thus, the execution S48 of the associated code.

Then, the execution S48 of the code causes to notify S49 an entity 35 running on the data lake 30 that a set 22 of data migrated to the relational database 21 is to be ingested and, this, according to given ingestion modalities. Such modalities are specified by the code as the latter executes. That is, this code is adapted, upon execution, to notify said entity and inform it about ingestion modalities to be observed. Such modalities may for instance describe which data (e.g., data tables) and how such data should be ingested into the lake. The entity 35 at stake can typically be regarded as a workflow, e.g., implemented by as part of a workflow scheduler, such as the so-called Apache Oozie Workflow Scheduler for Hadoop.

Finally, the set 22 of migrated data can be ingested S50 into the data lake 30, according to said modalities and, e.g., a work flow initiated (or even implemented) by the notified entity 35.

According to the above process, when data ingestors 2 want to move data into a data lake, they only have to perform standard ETL operations to move data into a relational database, which can be done with standard tools. Yet, behind the scene, the UDF causes, once triggered, to move the data into the data lake platform, e.g., into a Hadoop distributed file system (HDFS) of this platform, according to modalities specified by the UDF code. Thus, this approach simplifies the tasks of data ingestors 2, who only have to handle standard ETL operations.

In embodiments, said ingestion modalities notably specify whether said set 22 of data may be ingested in parallel. In addition, or in variants, such modalities may specify whether said set 22 should be appended to data already existing in the data lake 30 ("append" mode), upon ingestion thereof. The append mode is used to add and extend data that may be already be present in the data lake. Alternatively, the modalities may specify whether data should overwrite data already existing in the data lake 30 ("overwrite" mode), upon ingestion. That is, the overwrite mode typically copies one or more tables from the relational database 21 onto an area of the data lake where it overwrites existing data, as specified by said modalities. In variants, data may be both appended to already existing data while overwriting distinct, already existing data.

More generally, multiple modalities are preferably specified altogether. For example, apart from being ingested in parallel or not, the ingestion may possibly come in the two modes described above. I.e., ingestion modalities may further specify whether data 22 should be appended to already existing data and/or overwrite data in the data lake. In addition, filters may be available, which allow a user 2 to select a subset of the data from the relational database 21.

Furthermore, the user may possibly be able to indicate whether a catalogue should be updated or not, as discussed later in more detail.

Enabling parallel ingestions is particularly advantageous where said set 22 of data comprises a plurality of data tables, as subsets of such tables may be ingested in parallel. The number of such tables is typically limited by the resources allocated to ingestion as, e.g., on a Hadoop cluster. By default, the ingestion of a single table is not distributed across a cluster. If a table is large this may become the limiting factor as the ingestor must wait until the largest table is ingested before the updating of a database is complete. For this reason, a user may request that the ingestion of a specific table be performed in parallel to the ingestion of other tables.

Note, when migrating S40 data into the relational database 21, the standard ETL operations are preferably executed S44 on a dummy database table, as enabled by the relational database 21 provided. E.g., the database may put in a dummy table, whose only purpose is to trigger the ingestion. This dummy database table may possibly be subject to access rights governing the one or more users or applications allowed to perform the ingestion. In that case, the subsequent ingestion S50 will be performed in the extent permitted by such access rights, in addition to being performed according to said modalities. In variants, however, access rights are associated with the UDF itself, as in IBM Db2 databases.

The UDF may notably be associated with a so-called "SELECT" operation, which forms part of the ETL pipeline. In such a case, the ingestion modalities can be specified as parameters to the SELECT operation. Interestingly, the user can further specify a filter in the SELECT statement that triggers the UDF such that only part of the table is ingested, for example by imposing a "WHERE DATE" to be ulterior to a given (e.g., WHERE DATE >'2018-02-19'). The UDF may otherwise be associated with any other convenient ETL operation, such as INSERT, UPDATE, or DELETE.

Note, the technique to execute a UDF by issuing a "SELECT" operation on a dummy table is specific to IBM Db2 databases. In other databases such as the Oracle Database, UDFs are invoked slightly differently. Namely, on the IBM Db2 database, one may execute a command such as:
   select udf-name(udf-parameters) from sysibm.sysdummy1,
whereas with Oracle Database the same can be achieved by executing:
   call udf-name(udf-parameters) into: result
   print result In both cases, the UDF is executed in the database specific environment using the database specific language (here SQL). Still, different databases associate UDFs with different constructs, such that the UDF may, in general, be associated with other constructs.

Preferably, the notification S49 is, as per the execution of the UDF code, performed by writing a message describing said ingestion modalities into a work queue, e.g., a queue used by a workflow scheduler on the data lake side. In such a case, the subsequent ingestion S50 may be initiated by reading S52 the work queue, e.g., using a daemon process, so as to initiate a work flow S54-S58 to ingest said set 22 of data into the data lake 30. Note, however, that the entity may, upon receiving the notification S49, schedule S51 a deferred execution of this ingestion, as illustrated in FIG. 2.

In operation, this work flow may notably cause to recreate S55 a data structure of the data 15 migrated into the relational database 21 within a database table of the data lake 30. For example, the data lake 30 may be a Hadoop-enabled data lake 30 and said data structure may be recreated S55 onto the HDFS file system of the data lake. Note, the data structure may be recreated S55 a posteriori (i.e., after loading S54 the data, as in FIG. 2) or, in variants, apriori, i.e., prior to loading S54 the data, at variance with FIG. 2.

As another example, the work flow may cause to index S56 the ingested set 22 of data. In addition, and as evoked earlier, the work flow may possibly cause to cataloguing S57 such data 22, e.g., as per modalities specified by the user. E.g., once data has been moved into an area of the data lake where data is served to authorized users only, such data are registered in a metadata repository and this repository can be implemented as part of a larger catalogue, which can be used to browse and understand the available data assets. In that respect, the ingestion S50 may further comprise updating S58 access rules for the ingested set 22 of data.

In preferred embodiments, the data lake entity 35 is implemented as part of a workflow scheduler running on the data lake. The workflow may notably cause to load S54 the data 22 into the data lake (e.g., into an HDFS), recreate the relational table S55, update S57 the catalogue that contains the ingested table names and their metadata, and set S58 the access rights on the table. The relational table may for instance be recreated using a SQL query engine, such as BigSQL, Impala, etc., based on data copied from the relational data base. The user 2 may possibly want to inquire about the ingestion status and, to that aim, be able to query S61 contents in an ingestion log database to track S62 progress of the ingestion.

Note, the relational database 21 is typically provided S30 upon a data owner requesting S10 an ingestion of data into the data lake 30. That is, upon receiving the owner's request S10, an authorized entity proceeds to create S20 the needed relational database 21 and insert S20 an apposite UDF in the created database(s). In practice, the relational database 21 is preferably provided S30 as part of a relational database system 20 (also referred to as a "drop zone" in this document). This system comprises multiple, different databases 21-23. Each database 21-23 may for instance be customized with respect to a respective data source 11-13. Such data sources 11-13 may for example be data warehouses 11-13, which may require specific databases 21-23, as illustrated in FIG. 1. Then, data can be moved from the data warehouses 11-13 into respective relational databases 21-23 using any suitable technology, e.g., Db2-to-Db2, DataStage, etc., which are known per se. Other ETL tools can be used as well.

Figure 3:
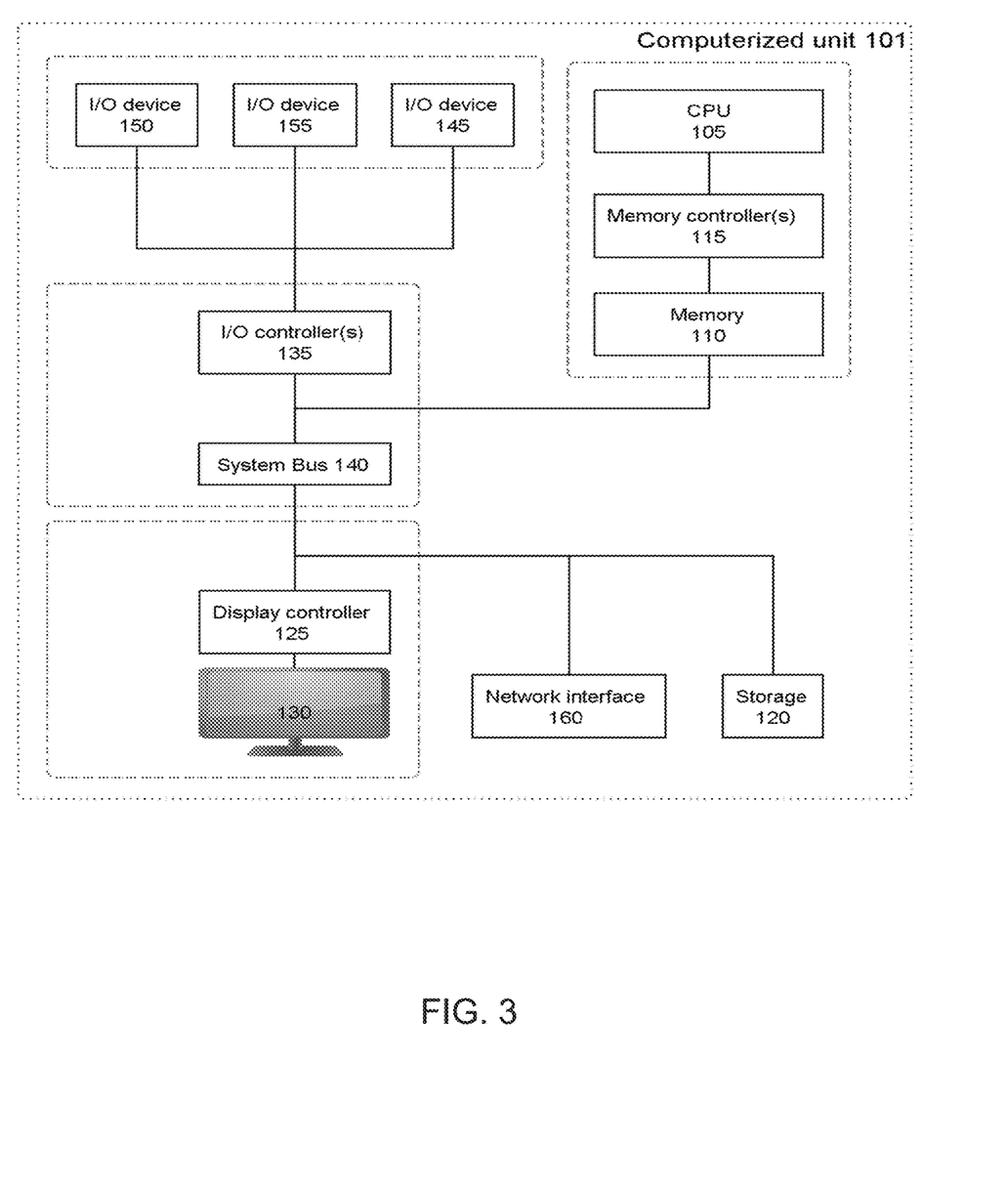
FIG. 3 schematically represents a general purpose computerized system, suited for implementing one or more method steps as involved in embodiments of the invention.

Next, according to another aspect, the invention can be embodied as a computer program product, designed to enable and ease ingestion of data, according to methods as described herein. The computer program product comprises a computer readable storage medium having program instructions embodied therewith. In practice, such instructions are executable by processing means of a computerized system, which may include one or more computerized units 101 such as depicted in FIG. 3. Upon execution, such instructions make it possible to run a relational database 21, wherein a UDF is associated with a standard ETL operation of an ETL pipeline, as described earlier. I.e., the UDF can be triggered upon performing said standard operation and thereby allow a UDF code to be executed. Thus, upon migrating S40 data 15 from a data source into the relational database 21 according to said ETL pipeline, said standard operation will happen to be executed S44 so as to trigger S46 said UDF and, in turn, an execution S48 of said code. This, in turn, notifies S49 an entity running on the data lake 30 that data 22 migrated to the database 21 is to be ingested according to given ingestion modalities, as specified by the code as the latter executes. Aspects of the present computer program products and computerized units that may be involved, in operation, are discussed in more detail in sect. 2.3 and 2.4.

The above embodiments have been succinctly described in reference to the accompanying drawings and may accommodate a number of variants. Several combinations of the above features may be contemplated. Examples are given in the next section.

2. Specific Embodiments and Technical Implementation Details

2.1 Specific Embodiments

This sub-section describes detailed mechanisms to extend the concept of user defined functions (UDFs) within a relational database such as Db2 to allow an ETL developer to trigger the ingestion of data into a data lake.

As explained earlier, the UDF is an application-specific piece of logic that can be associated with a specific action within the database. The UDF is triggered by an action taken within the relational database, which then notifies entities 35 running within the data lake about how and what data to ingest.

In preferred embodiments, such as described below, this action is designed to be a standard ETL operation such as the "SELECT" operation, which can conveniently be made part of an ETL pipeline defined using tools such as Data-Stage. The description of which and how the data are to be ingested is defined as parameters to this "SELECT" statement. The UDF notifies via a convenient notification system to the data lake that this data should be ingested. The ingestion request is scheduled and performed at a later time. The ETL operation is executed on a dummy database table whose only purpose is to trigger the ingestion. Access rights over this table may govern who is allowed to perform an ingestion from that database into the lake. In other implementations, each UDF may have associated access rights that govern who is allowed to trigger the ingestion, as noted earlier. The progress of the ingestion can be followed within the ETL by querying the contents of an ingestion log database.

The relational database instance from which data is to be ingested is here termed the drop zone. The drop zone is supported by standard relational technology such as Db2. The drop zone consists of multiple different databases 21-23, each corresponding to a specific data warehouse 11-13, as depicted in FIG. 1. Data is moved from the data warehouses 11-13 into the data lake 30 using any convenient technology, e.g., Db2to-Db2, Data Stage, etc.

Before migration of data into the drop zone, a data ware house owner 2 requests the creation of a drop zone database 21. The creation of this database 21 inserts the trigger mechanism into the database, and establishes correct access rights for a functional user 2 to read the data.

Once the data warehouse 11 has moved data into the database in the drop zone, the tables to be ingested are triggered by executing the trigger on the control database by the means described previously. The UDF that implements the trigger writes into a work queue a message describing which tables and how such tables should now be ingested into the lake.

The work queue is read by a daemon process and this initiates a work flow that actually performs the ingestion. This typically involves reading the data from the drop zone database and recreating the relational table within the database table on HDFS, (e.g., using BigSQL, Impala), indexing the data (e.g., using Elastic Search, SOLR), Cataloging the data (e.g., using IBM IGC, Apache Atlas), updating access rules (e.g., using Apache Ranger), and/or any other suitable action.

2.3 Computerized Units

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, FIG. 3 schematically represents a computerized unit 101, e.g., a general-purpose computer. Several computerized units 101 may be involved along the work flow path (e.g., in the data warehouses, on the data ingestors' side, on the data lake side). In exemplary embodiments, in terms of hardware architecture, as shown in FIG. 3, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes methods (or parts thereof) described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The system 100 can further include a display controller 125 coupled to a display 130. In exemplary embodiments, the system 100 can further include a network interface or transceiver 160 for coupling to a network (not shown, e.g., to set several units 101 in data communication along the work flow path S10-S62).

The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

2.4 Computer Program Products

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Scala or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computerized method for ingesting data from a relational database into a data lake, the method comprising:
providing a relational database, wherein a user-defined function, or UDF, is associated with a standard operation of extract, transform, load, or ETL, of an ETL pipeline, so as for the UDF to be triggered upon performing said standard operation and thereby allow a code associated with said UDF to be executed;
migrating data from one or more data sources into the relational database, according to said ETL pipeline, whereby said standard operation is executed so as to trigger said UDF and, in turn, an execution of said code;
as per the execution of said code, notifying an entity running on the data lake that a set of data migrated to said relational database is to be ingested according to given ingestion modalities specified by the code, notifying said entity comprising writing into a work queue a message describing said ingestion modalities; and
ingesting said set of data into the data lake according to said modalities.

2. The computerized method according to claim 1, wherein
said ingestion modalities specifies one or more of the following modalities:
whether said set of data may be ingested in parallel;
whether said set of data should be appended to data already existing in the data lake, upon ingestion; and
whether said set of data should overwrite data already existing in the data lake, upon ingestion.

3. The computerized method according to claim 2, wherein
said set of data comprises a plurality of data tables and said given ingestion modalities specifies that said data tables may be ingested in parallel.

4. The computerized method according to claim 1, wherein
at migrating data into the relational database, said standard operation is executed on a dummy database table enabled by the relational database provided.

5. The computerized method according to claim 4, wherein:
said dummy database table is subject to access rights governing one or more users or applications allowed to perform an ingestion of said set of data into the data lake; and
ingesting said set of data into the data lake is performed in an extent determined according to said access rights, in addition to being performed according to said modalities.

6. The computerized method according to claim 1, wherein the UDF is associated with a SELECT operation, which forms part of the ETL pipeline, whereby said ingestion modalities are specified as parameters to the SELECT operation.

7. The computerized method according to claim 1, wherein
ingesting said set of data into the data lake comprises reading the work queue by a daemon process, so as to initiate a work flow process to ingest said set of data into the data lake.

8. The computerized method according claim 1, wherein
ingesting said set of data comprises recreating a data structure of the data migrated into the relational database within a database table of the data lake.

9. The computerized method according to claim 8, wherein
the data lake is a Hadoop-enabled data lake with a Hadoop distributed file system, and wherein said data structure is recreated onto said Hadoop distributed file system.

10. The computerized method according claim 8, wherein
ingesting said set of data further comprises indexing said set of data.

11. The computerized method according to claim 8, wherein
ingesting said set of data further comprises cataloguing said set of data.

12. The computerized method according to claim 8, wherein
ingesting said set of data further comprises updating access rules for said set of data on the data lake.

13. The computerized method according claim 1, wherein
said entity is implemented as part of a workflow scheduler running on the data lake.

14. The computerized method according to claim 1, wherein
the method further comprises, at said entity running on the data lake:
scheduling, upon being notified that that said set of data is to be ingested, an ingestion of said set of data for a deferred execution of this ingestion.

15. The computerized method according claim 14, wherein the method further comprises:
querying contents of an ingestion log database to track progress of said ingestion.

16. The computerized method according to claim 1, wherein
said relational database is provided upon a data owner requesting ingestion of data into the data lake.

17. The computerized method according claim 16, wherein
said relational database is provided as part of a relational database system comprising multiple, different databases, each corresponding to a respective data source.

18. The computerized method according claim 16, wherein
the method further comprises, prior to providing said relational database, creating said relational database and inserting said UDF in the created database.

19. A computer program product for ingesting data from a relational database into a data lake, the computer program product comprising a computer readable storage medium having program instructions embodied therewith, the program instructions executable by one or more processors of a computerized system, to
run a relational database, wherein a user-defined function, or UDF, is associated with a standard operation of extract, transform, load, or ETL, of an ETL pipeline, so as for the UDF to be triggered upon performing said standard operation and thereby allow a code associated with said UDF to be executed, such that upon migrating data from one or more data sources into the relational database according to said ETL pipeline, said standard operation is executed so as to trigger said UDF and, in turn, an execution of said code, which notifies an entity running on the data lake that a set of data migrated to said relational database is to be ingested according to given ingestion modalities specified by the code, for subsequent ingestion of said set of data into the data lake according to said modalities, notifying said entity comprising writing into a work queue a message describing said ingestion modalities.

\* \* \* \* \*